(12) United States Patent
Bury et al.

(10) Patent No.: US 12,247,672 B2
(45) Date of Patent: Mar. 11, 2025

(54) HIGH-PRESSURE VALVE CARTRIDGE

(71) Applicant: H2O Jet, Inc., Tumwater, WA (US)

(72) Inventors: Gary N. Bury, Thorp, WA (US); Mark F. Huntley, Tumwater, WA (US); Lars P. Jorgensen, Rochester, WA (US)

(73) Assignee: H2O Jet, Inc., Tumwater, WA (US)

( * ) Notice: Subject to any disclaimer, the term of this patent is extended or adjusted under 35 U.S.C. 154(b) by 0 days.

(21) Appl. No.: 17/597,502

(22) PCT Filed: Jul. 9, 2020

(86) PCT No.: PCT/US2020/041450
§ 371 (c)(1),
(2) Date: Jan. 7, 2022

(87) PCT Pub. No.: WO2021/007456
PCT Pub. Date: Jan. 14, 2021

(65) Prior Publication Data
US 2022/0275873 A1  Sep. 1, 2022

Related U.S. Application Data

(60) Provisional application No. 62/872,648, filed on Jul. 10, 2019.

(51) Int. Cl.
*F16K 15/04* (2006.01)
*B26F 3/00* (2006.01)
*F16K 27/02* (2006.01)

(52) U.S. Cl.
CPC ............ *F16K 15/044* (2013.01); *B26F 3/004* (2013.01); *F16K 27/0245* (2013.01)

(58) Field of Classification Search
CPC ............... F16K 15/044; F16K 2200/50; F16K 2200/501; Y10T 137/7779
See application file for complete search history.

(56) References Cited

U.S. PATENT DOCUMENTS

| 3,084,709 A | 4/1963 | Flick et al. |
| 4,532,958 A | 8/1985 | Napolitano |
| 4,662,616 A * | 5/1987 | Hennells ................... F16F 9/43 251/63.4 |

(Continued)

FOREIGN PATENT DOCUMENTS

| IT | MC20080230 A1 | 6/2010 |
| WO | 2011092660 A2 | 8/2011 |
| WO | 2018087085 A1 | 5/2018 |

OTHER PUBLICATIONS

International Search Report and Written Opinion for PCT/US2020/041450, mailed Oct. 30, 2020, 12 pages.
EP Search Report mailed Jul. 11, 2023 PCT/US2020041450, 9 pages.

*Primary Examiner* — Kevin F Murphy
(74) *Attorney, Agent, or Firm* — Cozen O'Connor

(57) ABSTRACT

Disclosed herein are components, systems, and methods to improve performance and maintenance of high-pressure fluid systems, such as waterjet cutting systems. Specifically, embodiments of a valve cartridge are disclosed that include a pre-assembled body such that the valve cartridge is able to be inserted into a valve body of a valve assembly without the need for additional assembly or adjustment of the components of the valve cartridge, for example the poppet assembly of the valve cartridge.

25 Claims, 3 Drawing Sheets

(56) References Cited

U.S. PATENT DOCUMENTS

| | | | |
|---|---|---|---|
| 4,911,196 A | | 3/1990 | Kemp |
| 4,936,339 A | | 6/1990 | Bennett |
| 5,010,916 A | | 4/1991 | Albrecht |
| 5,186,393 A | | 2/1993 | Yie |
| 5,839,468 A | * | 11/1998 | Allred .................. F16K 15/028 137/543.19 |
| 5,960,822 A | * | 10/1999 | Matuschka ........... F16K 17/196 137/515.7 |
| 6,155,806 A | * | 12/2000 | Andel ................. F04B 53/1007 417/403 |
| 6,168,400 B1 | * | 1/2001 | Van Davelaar ......... F16K 17/18 137/454.2 |
| 6,470,909 B2 | * | 10/2002 | Osterlanger ............ F16K 47/16 137/514.3 |
| 6,668,856 B2 | * | 12/2003 | Warlick .................. F16K 15/04 239/572 |
| 6,936,161 B2 | | 8/2005 | Wright et al. |
| 9,556,963 B2 | * | 1/2017 | Hartmann ............. F16K 15/044 |
| 9,885,422 B2 | | 2/2018 | Driscoll et al. |
| 2004/0204679 A1 | | 10/2004 | Msconti et al. |
| 2004/0234380 A1 | | 11/2004 | Moutafis et al. |
| 2004/0234404 A1 | * | 11/2004 | Vicars .................... F04B 53/16 417/571 |
| 2010/0024891 A1 | | 2/2010 | Francini et al. |
| 2015/0219096 A1 | * | 8/2015 | Jain ........................ F04B 15/02 415/203 |
| 2015/0260177 A1 | * | 9/2015 | Deel ...................... F04B 37/12 29/890.12 |
| 2018/0239370 A1 | | 8/2018 | Perry et al. |

\* cited by examiner

HIGH-PRESSURE VALVE CARTRIDGE

BACKGROUND

Technical Field

This disclosure relates to high-pressure fluid systems and related methods, and more particularly, to a valve cartridge for use in high-pressure fluid systems and methods of manufacture and assembly related to the valve cartridge.

Description of the Related Art

High-pressure fluid systems have numerous applications including, but not limited to, use in waterjet cutting systems. High-pressure fluid systems include valves, which regulate the flow of a fluid by opening, closing, or partially obstructing a flow path of the fluid.

Examples of known valves are disclosed in U.S. Pat. Nos. 4,911,196; 4,532,958; and 9,885,422. Current valve designs, especially those suitable for use in high-pressure fluid systems, such as those used in the waterjet industry are difficult and time consuming to repair and replace requiring significant disassembly of components of the waterjet system. This disassembly may result in damage to one or more of the components (for example the seals) of the waterjet system.

BRIEF SUMMARY

Embodiments described herein provide a valve cartridge, for example a check valve cartridge, pre-assembled from the factory and configured to be "dropped into" a cavity in a valve body. According to one embodiment the valve cartridge can be asymmetric such that an inlet of the valve cartridge and an outlet of the valve cartridge are different.

According to one embodiment, a valve cartridge includes a pre-assembled body and a poppet assembly. The pre-assembled body includes a first surface and a second surface, and the pre-assembled body defines a through hole, which includes an inlet provided in the first surface and an outlet provided in the second surface. The poppet assembly is positioned within the through hole between the first surface and the second surface, and the poppet assembly is coupled to the pre-assembled body such that when installed and in operation the poppet assembly is able to transition from a first configuration in which fluid flow with a pressure greater than 20,000 psi through the through hole is blocked to an second configuration in which fluid flow with a pressure greater than 20,000 psi through the through hole is permitted.

Additional embodiments described herein provide a valve assembly including both at least one valve cartridge, for example the embodiment of the valve cartridge described above, and a valve body. The valve body can have specifically sized inlet and outlet engagement features, for example counter-bores, that prevent installation of a valve cartridge in an incorrect orientation with respect to the valve body. Alternatively, the valve body and valve cartridge can be a universal design, meaning the inlet and outlet engagement features are identical parts, and thus the valve cartridge is configured to be installed in the valve body in either direction based on desired water flow direction.

According to one embodiment, the valve cartridge defines a first recess and a second recess spaced apart from the first recess. The first recess defines a shape that corresponds to a first of the at least one valve cartridges when the first surface of the first valve cartridge faces the valve body, and the second recess defines a shape that corresponds to a second of the at least one valve cartridges when the second surface of the second valve cartridge faces the valve body.

Additional embodiments described herein provide a method of assembling a valve assembly, for example the embodiment of the valve assembly described above. The method includes removing a first valve cartridge from a first recess defined by a valve body, wherein during removal of the first valve cartridge a first pre-assembled body of the first valve cartridge remains assembled. Wherein the first pre-assembled body includes a first surface and a second surface, the first pre-assembled body defining a first through hole, the first through hole including a first inlet provided in the first surface and a first outlet provided in the second surface. Wherein the first valve cartridge includes a first poppet assembly, and when the first valve cartridge is assembled, installed, and in operation the first poppet assembly is positioned within the first through hole between the first surface and the second surface such that the first poppet assembly is able to transition from a first configuration in which fluid flow through the first through hole is blocked to a second configuration in which fluid flow through the first through hole is permitted.

According to one embodiment, the method of assembling the valve assembly further includes inserting a second valve cartridge into the first recess defined by the valve body. Wherein prior insertion into the first recess the second valve cartridge includes a second pre-assembled body and a second poppet assembly. The second pre-assembled body including a third surface and a fourth surface, the second pre-assembled body defining a second through hole, the second through hole including a second inlet provided in the third surface and a second outlet provided in the fourth surface. The second poppet assembly positioned within the second through hole between the third surface and the fourth surface, the second poppet assembly coupled to the second pre-assembled body such that when installed and in operation the second poppet assembly is able to transition from a first configuration in which fluid flow through the second through hole is blocked to a second configuration in which fluid flow through the second through hole is permitted.

Additional embodiments described herein provide a method of manufacturing a valve cartridge. The method of manufacturing includes positioning a poppet assembly within a through hole defined by a body of the valve cartridge, wherein the through hole extends from an inlet provided in a first surface of the body to an outlet provided in a second surface of the body. The method of manufacturing the valve cartridge further includes securing the poppet assembly within the through hole between the first surface and the second surface such that when installed and in operation the poppet assembly is able to transition from a first configuration in which fluid flow with a pressure greater than 20,000 psi through the through hole is blocked to a second configuration in which fluid flow with a pressure greater than 20,000 psi through the through hole is permitted, thereby defining an assembled valve cartridge. The method of manufacturing further includes placing the assembled valve cartridge in a packaging.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth to provide a thorough understanding of various disclosed embodiments. However, one of ordinary skill in the relevant art will recognize that embodiments may be practiced without one or more of these specific details, or with other methods, components, materials, etc. In other instances, well-known structures associated with high-pressure water systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. Reference herein to two elements "facing" or "facing toward" each other indicates that a straight line can be drawn from one of the elements to the other of the elements without contacting an intervening solid structure.

The headings and Abstract of the Disclosure provided herein are for convenience only and do not interpret the scope or meaning of the embodiments.

Figure 1:
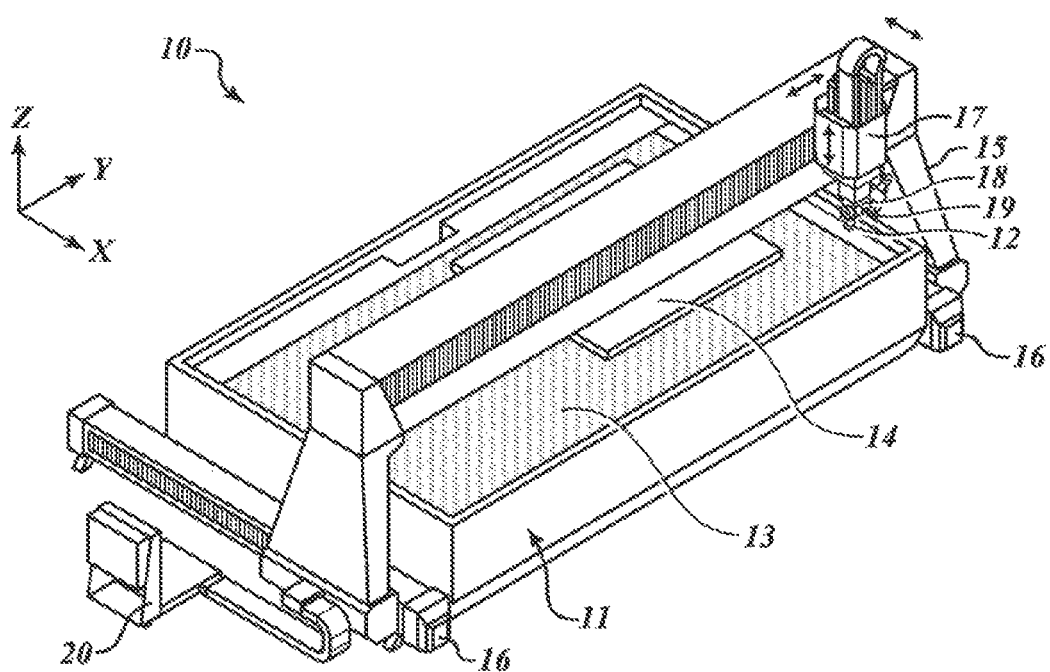
FIG. 1 is an isometric view of a waterjet cutting system according to one embodiment.

FIG. 1 shows an example embodiment of a high-pressure fluid system, specifically a waterjet cutting system 10. The waterjet cutting system 10 includes a catcher tank assembly 11 having a work support surface 13 (e.g., an arrangement of slats) that is configured to support a workpiece 14 to be processed by the system 10. The waterjet cutting system 10 further includes a bridge assembly 15 which is movable along a pair of base rails 16 and straddles the catcher tank assembly 11. In operation, the bridge assembly 15 can move back and forth along the base rails 16 with respect to a translational axis X to position a cutting head assembly 12 of the system 10 for processing the workpiece 14. A tool carriage 17 may be movably coupled to the bridge assembly 15 to translate back and forth along another translational axis Y, which is aligned perpendicularly to the aforementioned translational axis X. The tool carriage 17 may be configured to raise and lower the cutting head assembly 12 along yet another translational axis Z to move the cutting head assembly 12 toward and away from the workpiece 14. One or more manipulable links or members may also be provided intermediate the cutting head assembly 12 and the tool carriage 17 to provide additional functionality.

As an example, the waterjet cutting system 10 may include a forearm 18 rotatably coupled to the tool carriage 17 to rotate the cutting head assembly 12 about an axis of rotation, and a wrist 19 rotatably coupled to the forearm 18 to rotate the cutting head assembly 12 about another axis of rotation that is non-parallel to the aforementioned rotational axis. In combination, the rotational axes of the forearm 18 and the wrist 19 can enable the cutting head assembly 12 to be manipulated in a wide range of orientations relative to the workpiece 14 to facilitate, for example, cutting of complex profiles.

The rotational axes may converge at a focal point which, in some embodiments, may be offset from the end or tip of a nozzle component of the cutting head assembly 12. The end or tip of the nozzle component of the cutting head assembly 12 is preferably positioned at a desired standoff distance from the workpiece 14 or work surface to be processed. The standoff distance may be selected or maintained at a desired distance to optimize the cutting performance of the waterjet. For example, in some embodiments, the standoff distance may be maintained at about 0.20 inch (5.1 mm) or less, or in some embodiments at about 0.10 inch (2.5 mm) or less. In other embodiments, the standoff distance may vary over the course of a trimming operation or during a cutting procedure, such as, for example, when piercing the workpiece. In some instances, the nozzle component of the waterjet cutting head may be particularly slim or slender to enable, among other things, inclining of the nozzle component relative to the workpiece with minimal stand-off distance (e.g., a 30 degree inclination with standoff distance less than or equal to about 0.5 inch (12.7 mm)).

During operation, movement of the cutting head assembly 12 with respect to each of the translational axes and one or more rotational axes may be accomplished by various conventional drive components and an appropriate control system 20. The control system may generally include, without limitation, one or more computing devices, such as processors, microprocessors, digital signal processors (DSP), application-specific integrated circuits (ASIC), and the like. To store information, the control system may also include one or more storage devices, such as volatile memory, non-volatile memory, read-only memory (ROM), random access memory (RAM), and the like. The storage devices can be coupled to the computing devices by one or more buses.

The control system may further include one or more input devices (e.g., displays, keyboards, touchpads, controller modules, or any other peripheral devices for user input) and output devices (e.g., display screens, light indicators, and the like). The control system can store one or more programs for processing any number of different workpieces according to various cutting head movement instructions. The control system may also control operation of other components, such as, for example, a secondary fluid source, a vacuum device and/or a pressurized gas source coupled to the pure waterjet cutting head assemblies and components described herein.

The control system, according to one embodiment, may be provided in the form of a general purpose computer system. The computer system may include components such as a CPU, various I/O components, storage, and memory. The I/O components may include a display, a network connection, a computer-readable media drive, and other I/O devices (a keyboard, a mouse, speakers, etc.). A control system manager program may be executing in memory, such as under control of the CPU, and may include functionality related to, among other things, routing high-pressure water through the waterjet cutting systems described herein, providing a flow of secondary fluid to adjust or modify the coherence of a discharged fluid jet and/or providing a pressurized gas stream to provide for unobstructed pure waterjet cutting of a fiber reinforced polymer composite workpiece.

Further example control methods and systems for waterjet cutting systems, which include, for example, CNC functionality, and which are applicable to the waterjet cutting systems described herein, are described in Flow's U.S. Pat. No. 6,766,216, which is incorporated herein by reference in its entirety. In general, computer-aided manufacturing (CAM) processes may be used to efficiently drive or control a waterjet cutting head along a designated path, such as by enabling two-dimensional or three-dimensional models of workpieces generated using computer-aided design (i.e., CAD models) to be used to generate code to drive the machines. For example, in some instances, a CAD model may be used to generate instructions to drive the appropriate controls and motors of a waterjet cutting system to manipulate the cutting head about various translational and/or rotational axes to cut or process a workpiece as reflected in the CAD model. Details of the control system, conventional drive components and other well-known systems associated with waterjet cutting systems, however, are not shown or described in detail to avoid unnecessarily obscuring descriptions of the embodiments. Other known systems associated with waterjet cutting systems include, for example, a high-pressure fluid source (e.g., direct drive and intensifier pumps with pressure ratings ranging from about 60,000 psi to 110,000 psi and higher) to supply high-pressure fluid to the cutting head.

According to some embodiments, the waterjet cutting system 10 includes a pump, such as, for example, a direct drive pump or intensifier pump (not shown), to selectively provide a source of high-pressure water at an operating pressure of at least 60,000 psi or between about 60,000 psi and about 110,000 psi or higher. The cutting head assembly 12 of the waterjet cutting system 10 is configured to receive the high-pressure water supplied by the pump and to generate a high-pressure pure waterjet for processing workpieces. A fluid distribution system (not shown) in fluid communication with the pump and the cutting head assembly 12 is provided to assist in routing high-pressure water from the pump to the cutting head assembly 12.

Figure 2:
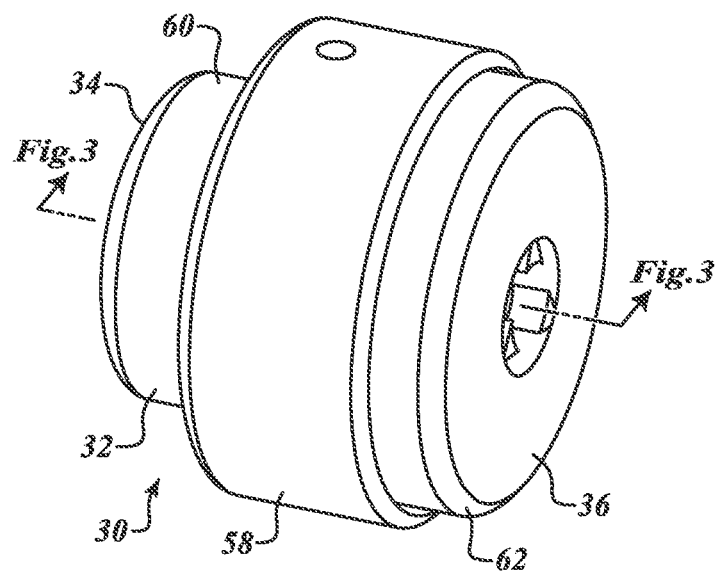
FIG. 2 is an isometric view of a valve cartridge according to one embodiment.
Figure 3:
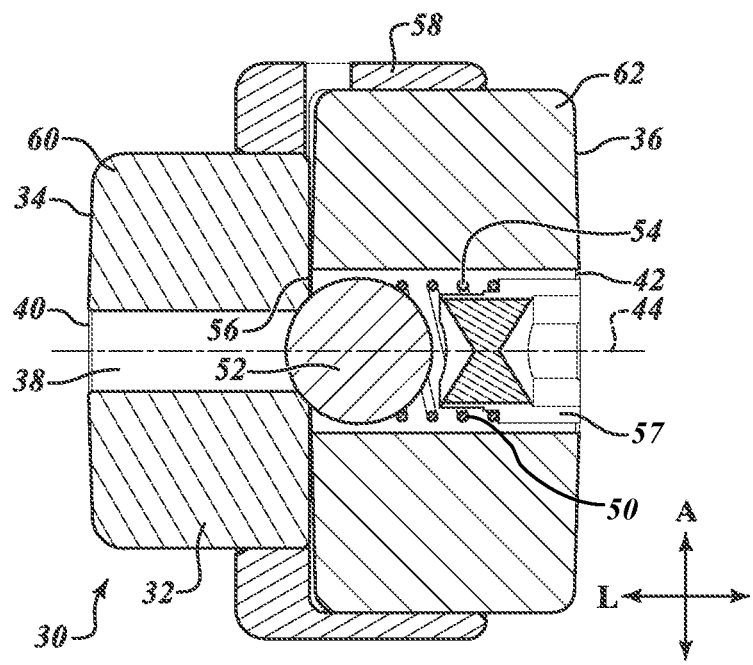
FIG. 3 is a side, cross-sectional view of the valve cartridge illustrated in FIG. 2 along line 3-3.

Referring to FIGS. 2 and 3, a valve cartridge 30 includes a pre-assembled body 32 having a first surface 34 and a second surface 36. As shown in the illustrated embodiment, the first surface 34 faces away from the second surface 36. According to one embodiment, the first surface 34 is parallel to and opposite the second surface 36. As shown, the first surface 34, the second surface 36, or both can be terminal surfaces, such that the pre-assembled body 32 terminates at both the first surface 34 and the second surface 36 with respect to a first direction, for example a longitudinal direction L.

The valve cartridge 30 includes a through hole 38, defined by the pre-assembled body 32. As shown in the illustrated embodiment, the through hole 38 can include an inlet 40 provided in the first surface 34 and an outlet 42 provided in the second surface 36. According to one embodiment, the inlet 40, the outlet 42, or both can be terminal features of the through hole 38, such that the through hole 38 terminates at one or more of the inlet 40 and the outlet 42 with respect to a direction, for example the longitudinal direction L.

The valve cartridge 30 can extend along a central axis 44, such that for example, the central axis 44 extends through a center of the through hole 38. As shown in the illustrated embodiment, the valve cartridge 30 can be radially symmetrical about the central axis 44.

The valve cartridge 30 can include a poppet assembly 50, according to one embodiment, positioned within the through hole 38 between the first surface 34 and the second surface 36. According to one embodiment, the poppet assembly 50 can be press-fit into a portion of the through hole 38. Alternatively, the poppet assembly 50 can be attached to the pre-assembled body 32 with one or more fasteners, adhesive, interlocking engagement features, or any combination thereof. The poppet assembly 50 can be coupled to the pre-assembled body 32 such that when installed and in operation the poppet assembly 50 is able to transition from a first configuration in which fluid flow through the through hole 38 is blocked to a second configuration in which fluid flow through the through hole 38 is permitted. According to one aspect of the disclosure, in the first configuration fluid flow with a pressure greater than 20,000 psi through the through hole 38 is blocked, and in the second configuration fluid flow with a pressure greater than 20,000 psi through the through hole 38 is permitted.

According to one embodiment, the poppet assembly 50 can include a poppet member 52, a biasing member 54, and a landing 56. In the first configuration the poppet member 52 can be in contact with the landing 56 to block the fluid flow. As shown in the illustrated embodiment, the landing 56 can include an internal surface of the pre-assembled body 32 that is between the first surface 34 and the second surface 36. The landing 56 can be parallel to and opposite, for example with respect to the longitudinal direction L, one of the first surface 34 and the second surface 36. According to another embodiment, the poppet assembly 50 can be devoid of any biasing member 54, such that the poppet assembly 50 instead relies on another force, fluid pressure within the through hole 38 for example, to move the poppet member 52 and transition the valve cartridge 30 from the first configuration to the second configuration.

The biasing member 54 can include a spring positioned relative to the poppet member 52 such that the biasing member 54 applies a force to the poppet member 52 that biases the poppet assembly 50 to the first configuration. Fluid flow through the through hole 38 in the same direction as the force is applied by the biasing member 54 to the poppet member 52 will not result in a transition from the first configuration to the second configuration. Fluid flow through the through hole 38 in a different direction, for example opposite, the direction the force is applied by the biasing member 54 to the poppet member 52 will result in a transition from the first configuration to the second configuration if the fluid flow applies a force to the poppet member 52 greater than the force applied by the biasing member 54 to the poppet member 52.

According to one embodiment, the poppet member 52 is a sphere, and the landing 56 defines a surface that corresponds to a portion of the poppet member 52. The poppet member 52 can make line contact with the landing 56, or alternatively, can make contact along a shape such as a frusto-spherical or frusto-conical shape. The poppet assembly 50 can further include a base member 57 that captures the biasing member 54 such that movement of the biasing member 54 within the through hole 38 (other than compression and expansion) is at least limited or entirely prevented.

The pre-assembled body 32, for example the first surface 34, can define a first cross-sectional dimension measured in a second direction that is perpendicular to the first direction, for example a lateral direction A. The pre-assembled body 32, for example the second surface 36, can further define a second cross-sectional dimension measured in the second direction. As shown in the illustrated embodiment, the first cross-sectional dimension can be different, for example smaller, than the second cross-sectional dimension. According to another embodiment, the first cross-sectional dimension can be larger than the second cross-sectional dimension. According to another embodiment, the first cross-sectional dimension can be equal to the second cross-sectional dimension.

A method of manufacturing the valve cartridge 30 includes positioning the poppet assembly 50 within the through hole 38 of the valve cartridge 30. The through hole 38 can extend from the inlet 40 provided in the first surface 34 to the outlet 42 provided in the second surface 36. The method of manufacturing the valve cartridge 30 can further include securing the poppet assembly 50 within the through hole 38 between the first surface 34 and the second surface 36 such that when installed and in operation the poppet assembly 50 is able to transition from the first configuration in which fluid flow with a pressure greater than 20,000 psi through the through hole is blocked to the second configuration in which fluid flow with a pressure greater than 20,000 psi through the through hole is permitted, thereby defining an assembled configuration of the valve cartridge 30.

The method of manufacturing the valve cartridge 30 can further include placing the valve cartridge 30, in the assembled configuration, into a packaging. The packaged valve cartridge 30 can then be shipped or sold to a customer such that the package can be opened and the valve cartridge 30 is ready to be coupled to the high-pressure water system, for example the waterjet cutting system 10, without any additional assembly or adjustment of the valve cartridge 30.

According to one embodiment, securing the poppet assembly 50 includes translationally and rotationally locking the first surface 34 relative to the second surface 36. Translationally and rotationally locking the first surface 34 relative to the second surface 36 can include coupling an outer sleeve 58 to both a first portion 60 of the valve cartridge 30, which includes the first surface 34, to a second portion 62 of the valve cartridge 30, which includes the second surface 36. As shown in the illustrated embodiment, the first portion 60 when coupled to the second portion 62, for example via the outer sleeve 58, forms at least a portion of the pre-assembled body 32. Alternatively, the pre-assembled body 32 can include a monolithic member, which includes both the first surface 34 and the second surface 36.

Securing the poppet assembly 50 can include positioning the poppet member 52 within a portion of the through hole 38 defined by one of the first portion 60 and the second portion 62 such that in the first configuration the poppet member 52 contacts the landing 56, which is defined by the other of the first portion 60 and the second portion 62.

Figure 4:
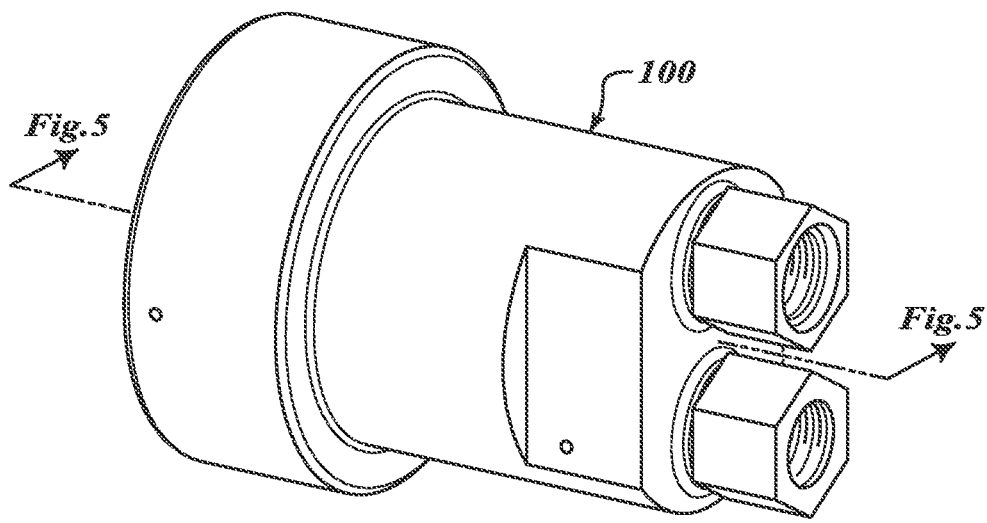
FIG. 4 is an isometric view of a valve body, according to one embodiment.
Figure 5:
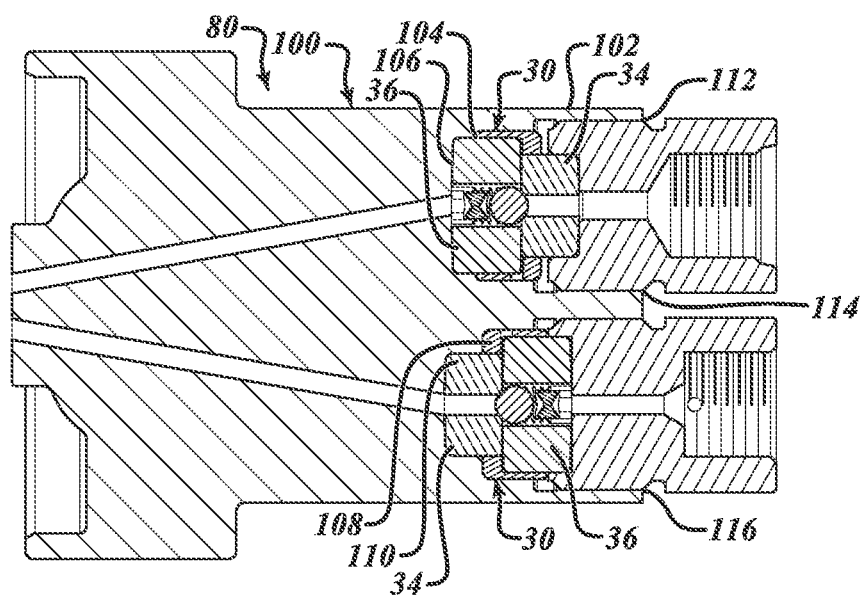
FIG. 5 is a side, cross-sectional view of the valve body illustrated in FIG. 4 along line 5-5, the valve body along with two of the valve cartridges illustrated in FIG. 2 collectively defining a valve assembly.

Referring to FIGS. 4 and 5, a valve assembly 80 can include a valve body 100 and at least one of the valve cartridges 30 as described above. Although described herein as part of the valve assembly 80, it will be appreciated that each of the valve cartridge 30 and the valve body 100 additionally forms a separate and independent embodiment of the disclosure.

The valve body 100 includes a housing 102 and a recess 104 at least partially defined by the housing 102. The recess 104 can extend into the housing 102 such that the recess 104 terminates at a base surface 106 of the housing 102. As shown in the illustrated embodiment, the recess 104 defines a shape that corresponds to at least a portion of the valve cartridge 30. According to one embodiment, the recess 104 defines a shape that only corresponds to at least a portion of the valve cartridge 30 when one of the first surface 34 and the second surface 36 faces the base surface 106. For example, the recess 104 can define a shape that only corresponds to at least a portion of the valve cartridge 30 when the second surface 36 faces the base surface 106, as shown. If the valve cartridge 30 is inserted into the recess 104 such that the first surface 34 faces the base surface 106, the shape of the recess 104 does not correspond to the first surface 34, thus preventing proper seating of the valve cartridge 30 within the valve body 100.

According to one embodiment, the valve body 100 can include a plurality of recesses such that the recess 104 is a first of the plurality of recesses. The plurality of recesses can include a second recess 108 at least partially defined by the housing 102. The second recess 108 can extend into the housing 102 such that the second recess 108 terminates at a second base surface 110 of the housing 102. As shown in the illustrated embodiment, the second recess 108 defines a shape that corresponds to at least a portion of the valve cartridge 30.

According to one embodiment, the second recess 108 defines a shape that only corresponds to at least a portion of the valve cartridge 30 when one of the first surface 34 and the second surface 36 of the valve cartridge 30 faces the base surface 110. For example, the second recess 108 can define a shape that only corresponds to at least a portion of the valve cartridge 30 when the first surface 34 faces the base surface 110, as shown. If the valve cartridge 30 is inserted into the recess 110 such that the second surface 36 faces the base surface 110, the shape of the second recess 108 does not correspond to the first surface 36, thus preventing proper seating of the valve cartridge 30 within the valve body 100. As shown the valve body can include a first recess 104 with a shape that corresponds to valve cartridge 30 when only one of the first surface 34 and the second surface 36 faces the base surface 106, and a second recess 108 with a shape that corresponds to valve cartridge 30 when only the other of the first surface 34 and the second surface 36 faces the base surface 110.

The valve body 100 can include a front surface 112 that defines a first opening 114 of the first recess 104 such that the first recess 104 extends from the first opening 114 in the front surface 112 to the base surface 106. As shown in the illustrated embodiment, the front surface 112 can further define a second opening 116 of the second recess 108 such that the second recess 108 extends from the second opening 116 in the front surface 112 to the base surface 110. As shown, the first opening 114 can define an enclosed shape in the first surface 112. The second opening 116 can further define an enclosed shape in the first surface 114 that is remote from the first opening 116. According to another embodiment, the first opening 114 and the second opening can be defined by different surfaces of the valve body 100, for example surfaces that are opposite each other, or that are angularly offset (non-parallel), for example perpendicular, with respect to one another.

Referring to FIGS. 2 to 5, a method of assembling the valve assembly 80 can include removing a first one of the valve cartridges 30 from the first recess 104 of the valve body 100, such that during removal of the first one of the valve cartridges 30 the pre-assembled body 32 of the first one of the valve cartridges 30 remains assembled. According to one embodiment, the pre-assembled body 32 of the first one of the valve cartridges 32 can include the first surface 34 and the second surface 36. The pre-assembled body 32 of the first one of the valve cartridges 30 can define the through hole 38, which includes the inlet 40 provided in the first surface 34 and the outlet 42 provided in the second surface 36.

The first one of the valve cartridges 30 includes the poppet assembly 50, and when the first one of the valve cartridges 30 is assembled, installed, and in operation the poppet assembly 50 is positioned within the through hole 38 between the first surface 34 and the second surface 36 such that the poppet assembly 50 is able to transition from the first configuration in which fluid flow through the through hole 38 is blocked to the second configuration in which fluid flow through the through hole 38 is permitted.

The method of assembling the valve assembly 80 can further include inserting a second one of the valve cartridges 30 into the first recess 104 defined by the valve body 100, wherein prior to insertion into the first recess 104 the second one of the valve cartridges 30 includes a second pre-assembled body 32 including respective first and second surfaces 34, 36. The second pre-assembled body 32 can define a second through hole 38, which includes a respective inlet 40 and outlet 42 provided in the respective first and second surfaces 34, 36.

The second one of the valve cartridges 30 includes a second poppet assembly 50 positioned within the second through hole 38 between the respective first and second surfaces 34, 36, such that the second poppet assembly 50 is coupled to the second pre-assembled body 32 such that when installed and in operation the second poppet assembly 50 is able to transition from the first configuration in which fluid flow through the second through hole 38 is blocked to the second configuration in which fluid flow through the second through hole 38 is permitted.

The method of assembling the valve assembly can further include removing a third one of the valve cartridges 30 from the second recess 108, wherein during removal of the third one of the valve cartridges 30 a third pre-assembled body 32 of the third one of the valve cartridges 30 remains assembled. The third pre-assembled body 32 includes respective first and second surfaces 34, 36, and defines a third through hole 38. The third through hole 38 including a respective inlet 40 and outlet 42 provided in the respective first and second surfaces 34, 36.

The third one of the valve cartridges 30 includes a third poppet assembly 50 positioned within the third through hole 38 between the respective first and second surfaces 34, 36, such that the third poppet assembly 50 is coupled to the third pre-assembled body 32 such that when installed and in operation the third poppet assembly 50 is able to transition from the first configuration in which fluid flow through the third through hole 38 is blocked to the second configuration in which fluid flow through the third through hole 38 is permitted.

The method of assembling the valve assembly 80 can further include inserting a fourth one of the valve cartridges 30 into the second recess 108 defined by the valve body 100, wherein prior to insertion into the second recess 108 the fourth one of the valve cartridges 30 includes a fourth pre-assembled body 32 including respective first and second surfaces 34, 36. The fourth pre-assembled body 32 can define a fourth through hole 38, which includes a respective inlet 40 and outlet 42 provided in the respective first and second surfaces 34, 36.

The fourth one of the valve cartridges 30 includes a fourth poppet assembly 50 positioned within the fourth through hole 38 between the respective first and second surfaces 34, 36, such that the fourth poppet assembly 50 is coupled to the fourth pre-assembled body 32 such that when installed and in operation the fourth poppet assembly 50 is able to transition from the first configuration in which fluid flow through the fourth through hole 38 is blocked to the second configuration in which fluid flow through the fourth through hole 38 is permitted.

According to one embodiment, the method of assembling the valve assembly 80 includes inserting the second one of the valve cartridges 30 into the first recess 104 such that the respective first surface 34 faces toward the valve body 100, for example the base surface 106. The method of assembling the valve assembly 80 can further include inserting the fourth one of the valve cartridges 30 into the second recess 108 such that the respective second surface 36 faces toward the valve body 100, for example the base surface 110.

According to one embodiment, the method of assembling the valve assembly 80 can further include passing a fluid flow with a pressure greater than 20,000 psi through the inlet 40 of the second one of the valve cartridges 30, through the second poppet assembly 50 in the second configuration, and through the outlet 42 of the second one of the valve cartridges 30.

Once one of the valve cartridges 30 is inserted into the respective recess, the valve cartridge 30 can be secured relative to the valve body 100 within the respective recess.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

The various embodiments described above can be combined to provide further embodiments. All of the commonly assigned US patent application publications, US patent applications, foreign patents, and foreign patent applications referred to in this specification, including but not limited to U.S. Patent Application No. 62/872,648, filed Jul. 10, 2019, entitled "HIGH-PRESSURE VALVE CARTRIDGE" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A valve cartridge comprising:
a pre-assembled body including:
a first portion having a first surface;
a second portion having a second surface, the second surface opposite the first surface with respect to a first direction; and
an outer sleeve that partially receives both the first portion and the second portion therein securing the first portion relative to the second portion such that an entirety of the outer sleeve is positioned between the first surface and the second surface with respect to the first direction, wherein the pre-assembled body defines a through hole extending from an inlet provided in the first surface to an outlet provided in the second surface along an axis that is parallel to the first direction; and
a poppet assembly positioned within the through hole between the first surface and the second surface, the poppet assembly including a poppet member and a biasing member both positioned between the first surface and the second surface, and the poppet assembly coupled to the pre-assembled body such that when installed and in operation the poppet assembly is able to transition from a first configuration in which a first portion of the poppet member is enclosed within the first portion, a second portion of the poppet member is enclosed within the second portion, and fluid flow with a pressure greater than 20,000 psi through the through hole is blocked to a second configuration in which fluid flow with a pressure greater than 20,000 psi through the through hole is permitted,
wherein transition from the first configuration to the second configuration includes movement of the poppet member along the axis.

2. The valve cartridge of claim 1, further comprising a landing that contacts the poppet member in the first configuration to block the fluid flow.

3. The valve cartridge of claim 2 wherein the biasing member is a spring, and the spring is positioned within the poppet assembly such that the spring biases the poppet member toward the landing.

4. The valve cartridge of claim 2 wherein the poppet member includes a contact surface, which is in contact with the landing when the poppet assembly is in the first configuration.

5. The valve cartridge of claim 4 wherein the contact surface defines one of a frusto-spherical shape, a frusto-conical shape, a cylindrical shape, a conical shape, or a wedge shape.

6. The valve cartridge of claim 4 wherein the contact surface contacts the landing along one of: a line, a frusto-spherical shape, a frusto-conical shape, a cylindrical shape, or a wedge shape.

7. The valve cartridge of claim 1 wherein the first surface defines a first cross-sectional dimension measured in a second direction that is perpendicular to the first direction, the second surface defines a second cross-sectional dimension measured in the second direction, and the first cross-sectional dimension is different than the second cross-sectional dimension.

8. The valve cartridge of claim 7 wherein the outer sleeve defines a third cross-sectional dimension measured in the second direction, and the third cross-sectional dimension is greater than both the first cross-sectional dimension and the second cross-sectional dimension.

9. A valve assembly comprising:
a valve body defining a first recess and a second recess spaced apart from the first recess;
a first one of the valve cartridge of claim 1; and
a second one of the valve cartridge of claim 1,
wherein the first recess defines a shape that corresponds to the first valve cartridge when the first surface of the first valve cartridge faces the valve body and corresponds to the second valve cartridge when the first surface of the second valve cartridge faces the valve body, and the second recess defines a shape that corresponds to the first valve cartridge when the second surface of the first valve cartridge faces the valve body and corresponds to the second valve cartridge when the second surface of the second valve cartridge faces the valve body.

10. The valve assembly of claim 9 wherein the valve body includes a front surface, the front surface defines a first opening of the first recess, and the front surface defines a second opening of the second recess.

11. The valve assembly of claim 10 wherein the first opening defines an enclosed shape, and the second opening defines an enclosed shape remote from the first opening.

12. The valve assembly of claim 9 wherein the valve body includes a first surface and a second surface, the first surface defines a first opening of the first recess, the second surface defines a second opening of the second recess, and the first surface and the second surface face in opposite directions.

13. The valve assembly of claim 9 wherein the valve body includes a first surface and a second surface, the first surface defines a first opening of the first recess, the second surface defines a second opening of the second recess, and the first surface is non-parallel to the second surface.

14. The valve assembly of claim 9 wherein the shape of the first recess is different from the shape of the second recess.

15. The valve cartridge of claim 1 wherein the axis along which the poppet member moves during transition from the first configuration to the second configuration intersects both the inlet and the outlet.

16. The valve cartridge of claim 1, further comprising a base member that supports the biasing member within the through hole such that movement of the biasing member is limited in one or more degrees of freedom, wherein the base member is positioned between the first surface and the second surface.

17. A valve assembly comprising:
a valve body defining a first recess and a second recess spaced apart from the first recess;
a first valve cartridge and a second valve cartridge, each of the first and second valve cartridges including:
a pre-assembled body including:
a first portion having a first surface;
a second portion having a second surface, the second surface opposite the first surface with respect to a first direction; and
an outer sleeve that partially receives both the first portion and the second portion therein securing the first portion relative to the second portion, wherein the pre-assembled body defines a through hole extending from an inlet provided in the first surface to an outlet provided in the second surface along an axis that is parallel to the first direction; and a poppet assembly positioned within the through hole between the first surface and the second surface, the poppet assembly including a poppet member and a biasing member, the poppet assembly coupled to the pre-assembled body such that when installed and in operation the poppet assembly is able to transition from a first configuration in which fluid flow with a pressure greater than 20,000 psi through the through hole is blocked to a second configuration in which fluid flow with a pressure greater than 20,000 psi through the through hole is permitted, wherein transition from the first configuration to the second configuration includes movement of the poppet member along the axis, wherein the first recess defines a shape that corresponds to the first valve cartridge when the first surface of the first valve cartridge faces the valve body and corresponds to the second valve cartridge when the first surface of the second valve cartridge faces the valve body, and the second recess defines a shape that corresponds to the first valve cartridge when the second surface of the first valve cartridge faces the valve body and corresponds to the second valve cartridge when the second surface of the second valve cartridge faces the valve body.

18. The valve assembly of claim 17 wherein the valve body includes a front surface, the front surface defines a first opening of the first recess, and the front surface defines a second opening of the second recess.

19. The valve assembly of claim 18 wherein the first opening defines an enclosed shape, and the second opening defines an enclosed shape remote from the first opening.

20. The valve assembly of claim 17 wherein the valve body includes a first surface and a second surface, the first surface defines a first opening of the first recess, the second surface defines a second opening of the second recess, and the first surface and the second surface face in opposite directions.

21. The valve assembly of claim 17 wherein the valve body includes a first surface and a second surface, the first surface defines a first opening of the first recess, the second surface defines a second opening of the second recess, and the first surface is non-parallel to the second surface.

22. The valve assembly of claim 17 wherein the shape of the first recess is different from the shape of the second recess.

23. A valve cartridge comprising:
a pre-assembled body including:
   a first portion having a first surface;
   a second portion having a second surface, the second surface opposite the first surface with respect to a first direction; and
   an outer sleeve that partially receives both the first portion and the second portion therein securing the first portion relative to the second portion,
   wherein the pre-assembled body defines a through hole extending from an inlet provided in the first surface to an outlet provided in the second surface along an axis that is parallel to the first direction, and
   wherein the pre-assembled body defines a maximum cross-sectional dimension measured in a second direction that is perpendicular to the first direction, a first portion of the maximum cross-sectional dimension is defined by the first portion, a second portion of the maximum cross-sectional dimension is defined by the outer sleeve, and a third portion of the maximum cross-sectional dimension is defined by the second portion; and a poppet assembly positioned within the through hole between the first surface and the second surface, the poppet assembly including a poppet member and a biasing member both positioned between the first surface and the second surface, and the poppet assembly coupled to the pre-assembled body such that when installed and in operation the poppet assembly is able to transition from a first configuration in which a first portion of the poppet member is enclosed within the first portion, a second portion of the poppet member is enclosed within the second portion, and fluid flow with a pressure greater than 20,000 psi through the through hole is blocked to a second configuration in which fluid flow with a pressure greater than 20,000 psi through the through hole is permitted, wherein transition from the first configuration to the second configuration includes movement of the poppet member along the axis.

24. The valve cartridge of claim 23 wherein the second portion of the maximum cross-sectional dimension is between the first portion of the maximum cross-sectional dimension and the third portion of the maximum cross-sectional dimension with respect to the first direction.

25. The valve cartridge of claim 23 wherein the outer sleeve partially receives both the first portion and the second portion therein such that an entirety of the outer sleeve is positioned between the first surface and the second surface with respect to the first direction.

* * * * *